United States Patent [19]

Pak et al.

[11] Patent Number: 4,919,946

[45] Date of Patent: * Apr. 24, 1990

[54] EDIBLE FOOD PRODUCT

[76] Inventors: Tong S. Pak; Tae S. Pak, both of Rt. 15, Box 115, Oak Grove Cir., Statesville, N.C. 28677

[*] Notice: The portion of the term of this patent subsequent to Aug. 23, 2005 has been disclaimed.

[21] Appl. No.: 371,036

[22] Filed: Jun. 26, 1989

[51] Int. Cl.⁵ ............................................. A23L 1/00
[52] U.S. Cl. ....................................... 426/89; 426/92; 426/94; 426/274; 426/275; 426/138
[58] Field of Search ............... 426/128, 138, 274, 275, 426/92, 94, 89

[56] References Cited

U.S. PATENT DOCUMENTS

| | | | |
|---|---|---|---|
| 1,807,189 | 5/1931 | Bemés | 426/92 |
| 2,156,145 | 4/1939 | Cavett et al. | 426/138 |
| 2,892,719 | 6/1959 | Lynn | 426/138 |
| 3,290,154 | 12/1966 | Turner | 426/139 |
| 3,821,425 | 6/1974 | Russell | 426/134 |
| 4,205,091 | 5/1980 | Van Horne | 426/139 |
| 4,463,021 | 7/1984 | Eufemia | 426/138 |
| 4,472,440 | 9/1984 | Bank | 426/138 |

Primary Examiner—Marianne Cintins
Assistant Examiner—Mary S. Mims
Attorney, Agent, or Firm—Birch, Stewart, Kolasch & Birch

[57] ABSTRACT

An edible food product including an edible container inserted between two slices of bread or the like, wherein the edible container is adapted to contain a large quantity of unique foods such as noodles, hot dot, cooked vegetable, cooked or fresh mushroom, barbecue foods, etc. for preventing the unique foods from falling from the edible food product and providing for sufficient amounts of unique food for good health. The edible container, having a V-shaped configuration includes an outward bent circumferential and edge disposed along the top edge and a plate bottom or an opening disposed in the center of the plate bottom surface thereof for causing the container to tightly adhere to two slices of bread.

16 Claims, 2 Drawing Sheets

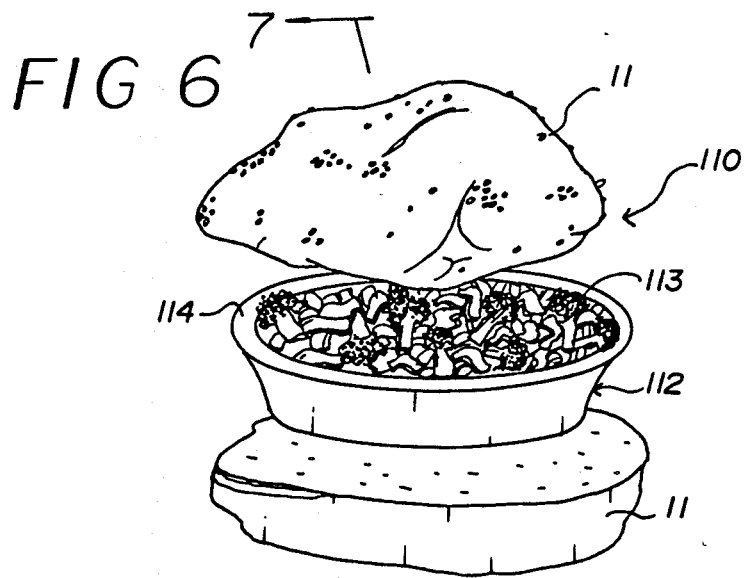
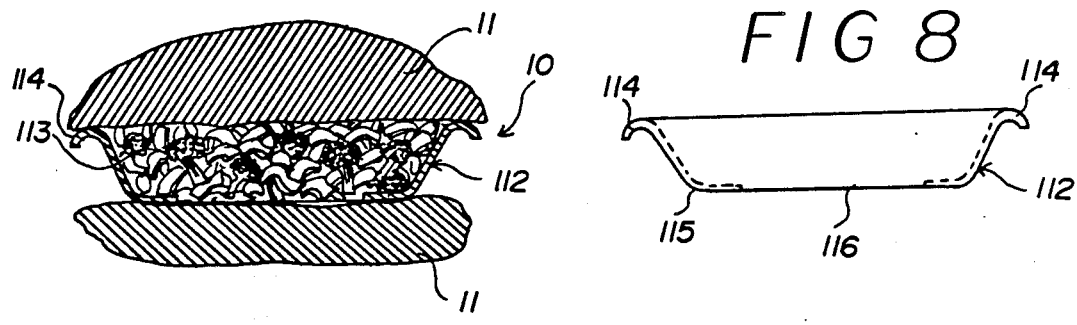
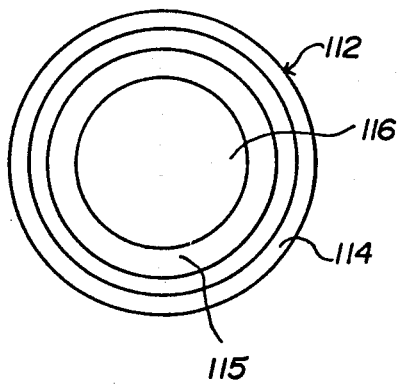
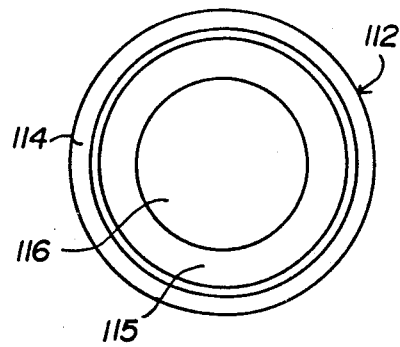

4,919,946

EDIBLE FOOD PRODUCT

BACKGROUND OF THE INVENTION

1. Field of the Invention

The present invention relates to an edible food product. More particularly, the present invention relates to a food product such as a sandwich composed of two slices of bread, two pieces of bun, two pieces of rice cake, two slices of cracker, or other equivalent food products which contains an edible container disposed therein for holding a large quantity of an unique foods such as noodles, hot dog, cooked vegetable, fresh salad, cooked or fresh mushroom, barbecue foods, fruit jam, gel butter, a mixture thereof, or the like for preventing the unique foods from falling from the edible food product and for allowing the foods to be conveniently eaten without dishes, forks, knives, spoons, chopsticks, etc.

2. Description of the Prior Art

Over the years the American sandwich such as, for example, the hamburger sandwich, has become a truly national food. In fact, the popularity of the hamburger sandwich today has accelerated such that it probably enjoys a popularity equal to or greater than that of all other sandwiches. In keeping with the ever increasing demand for sandwiches, the food industry has converted what was traditionally a food requiring many hours in the making into a fast food product. Also, in the ever increasing demand for hamburger sandwiches and other sandwiches containing a large quantity of fresh salad such as slices of pickles, slices of tomatoes, slices of onions and a garnish such as lettuce, the industry has provided restaurants with salad bars for use in garnishing sandwiches such as hamburgers. However, in this matter, it is difficult to insert large quantities of garnish material into the hamburgers since the materials tend to fall from the hamburgers.

Because of the desire to provide salad type garnish for sandwiches which can be readily incorporated into the sandwiches and easily eaten while avoiding undue mess, many attempts have been made to facilitate the manner in which salad is added to a sandwich. None of these attempts can actually claim to have succeeded in this regard. Consider, for example, U.S. Pat. No. 1,807,189 to Bemis which discloses a food product such as a sandwich wherein a bun is split at its sides and bottom end to form a pocket and a garnished filler made of solid edibles, is inserted into the pocket. These fillers often consist of a garnish in the form of lettuce, a meat product or hot-dogs, and a further garnish or appetizer in the form of pickle slices. However, since the garnish is assembled together with the hot meat product recently cooked, the fresh lettuce and cold pickle in the pocket of the Bemis patent is converted to a warm salad. Furthermore, it is difficult to insert fillers in all quantities into the pocket of the Bemis patent.

Accordingly, the present applicant developed an improvement in such sandwiches as disclosed in U.S. Pat. No. 4,765,998 entitled "EDIBLE FOOD PRODUCT". However, this edible food product discloses a food product which contains an edible container disposed therein for holding only fresh salads to be eaten with meat, such as a hamburger. However, this edible food product does not disclose the use of an edible container inserted between two slices of bread, containing unique foods such as noodles, hot dog, cooked vegetable, fresh salad, cooked or fresh mushroom, barbecue foods, fruit jam, gel butter, or a mixture thereof for preventing the unique foods from falling from the edible food product.

SUMMARY OF THE INVENTION

Accordingly, it is an object of the present invention to provide an improved food product containing an edible container disposed therein and a process of making the same.

Another object of the present invention is to provide a food product containing an edible dish inserted between two slices of bread or the like. The dish is adapted to contain a large quantity of unique food such as noodles, hot dog, cooked vegetable, fresh salad, cooked or fresh mushroom, barbecue foods, fruit jam, gel butter, or a mixture thereof for preventing the unique foods from falling from the edible food product and providing the sufficient unique food for good health.

A further object of the present invention is to provide a sandwich composed of two slices of bread, two slices of cracker, two pieces of rice cake, two pieces of bun, or the like, which contains an edible dish disposed therein which is structured with an outward bent circumferential end edge disposed along the top edge and a plate bottom or an opening disposed in bottom surface thereof whereby the edible dish is adapted to be adhered to the two slices of bread or the like.

Still another object of the present invention is to provide a sandwich which contains an edible dish disposed therein which has a V-shaped configuration to allow for convenient stacking during storage.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to an edible food product including an edible container inserted between two slices of bread or the like, the edible container adapted to contain a large quantity of unique foods such as noodles, hot dog, cooked vegetable, fresh salad, cooked or fresh mushroom, barbecue foods, etc. for preventing the unique foods from falling from the edible food product and providing for sufficient amounts of unique food for good health. The edible container, having a V-shaped configuration includes an outward bent circumferential end edge disposed along the top edge and a plate bottom or an opening disposed in the center of the plate bottom thereof for causing the container to tightly adhere to two slices of bread.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a perspective view illustrating another embodiment of an edible food product containing an edible container according to the present invention;

FIG. 7 is a cross-sectional view, taken along line 7—7 of FIG.

FIG. 8 is a front elevational view of the edible container of FIG. 6 according to the present invention;

FIG. 9 is a top plan view of the edible container of FIG. 6 according to the present invention; and FIG. 10 is a bottom plan view of the edible container of FIG. 6 according to the present invention.

DESCRIPTION OF THE PREFERRED EMBODIMENTS

The present invention is unique in that it is distinguishable from a sandwich which is made-to-order, even though it appears similar to such a sandwich. The reason for this is probably due most significantly to the fact that the edible container contains a large quantity of unique food such as noodles, hot dog, cooked vegetable, fresh salad, cooked or fresh mushroom, barbecue foods, fruit jam, gel butter, a mixture thereof, or the like therein and also to the fact that the specially configurated container tightly adheres to the bread in the sandwich. Advantageously such unique food is secured within the edible container and thus does not scatter from the sandwich so that the consumer can eat a large quantity of such unique food contained therein for good health.

Figure 1:
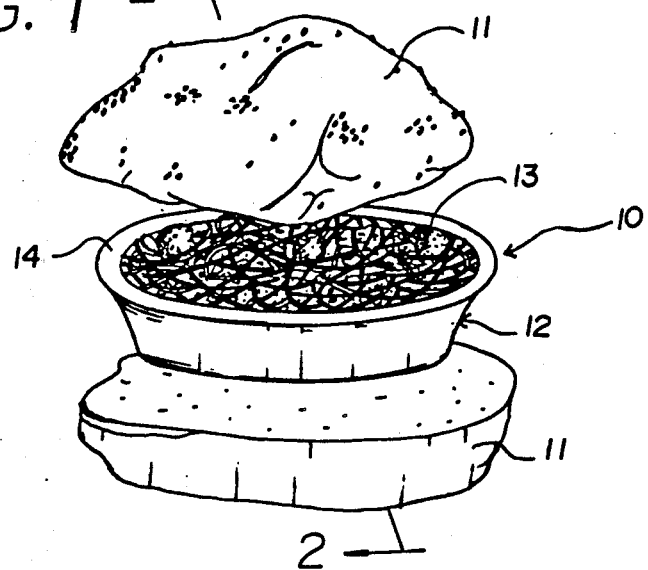
FIG. 1 is a perspective view of an edible food product containing an edible container according to the present invention.
Figure 2:
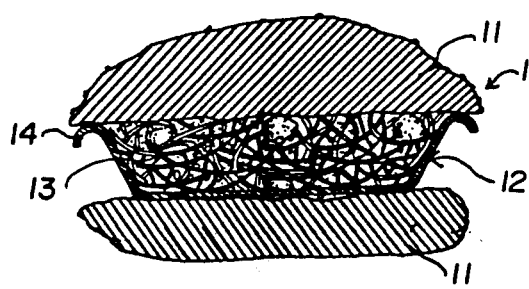
FIG. 2 is a cross-sectional view taken along line 2—2 of FIG. 1.

Referring now in detail to the drawing for the purpose of illustrating the present invention, the edible food product, for example, the sandwich 10 as shown in FIGS. 1 and 2, includes an edible container 12 for housing an unique foods 13 such as noodles, hot dog, cooked vegetable, fresh salad, cooked or fresh mushroom, barbecue foods, fruit jam, gel butter, a mixture thereof and the like. And the edible food product 10 further includes two slices of bread 11, two cracker slices, two pieces of rice cake, two pieces of bun, or the like.

Figure 3:
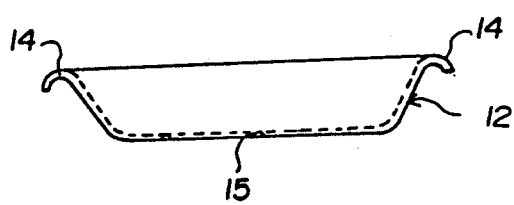
FIG. 3 is a front elevational view of the edible container according to the present invention.
Figure 4:
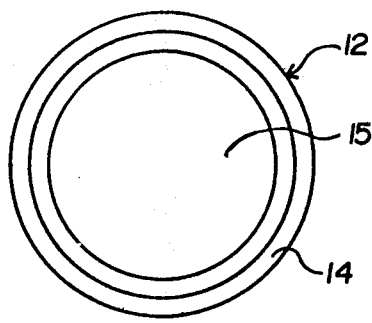
FIG. 4 is a top plan view of the edible container according to the present invention.
Figure 5:
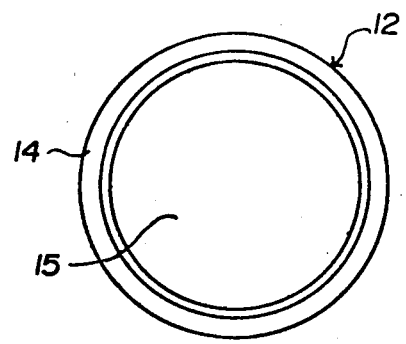
FIG. 5 is a bottom plan view of the edible container according to the present invention.

As shown in FIGS. 3, 4, and 5, the edible container 12 such as an edible dish includes an outward bent circumferential end edge 14 disposed along the top edge and a plate bottom 15 disposed at the bottom thereof so as to tightly adhere the edible container 12 to the inner surfaces of two slices of bread 11 or the like (FIG. 2). Also, the edible container 12 can be formed into a V-shaped configuration to allow for convenient stacking during storage (FIG. 3).

Usually the edible container 12 contains unique foods 13 such as noodles, hot dog, cooked vegetable, fresh salad, cooked or fresh mushroom, barbecue foods, fruit jam, gel butter, a mixture thereof, or the like may be inserted between two slices of bread 11. Therefore, the unique foods 13 may scatter and fall from the sandwich 10. Further, the edible container 12 cannot contain a sufficient quantity of the unique food therein. However, according to the present invention, the use of edible container 12 which houses the unique foods 13 therein prevents the unique foods 13 from falling from the sandwich 10 and provides for the containment of a sufficient amount of unique food 13 for good health in eating.

The edible container 12 such as the edible dish is made of edible materials such as potato, corn, wheat flour, and/or rice and is cooked in a conventional manner. The edible dish 12 according to the present invention is conventionally reconstituted such as by broiling, frying in oil and/or baking.

When the edible dish 12 is made mainly of potato, for example, in an amount of 80% by weight, then fried in oil and inserted in the sandwich 10 according to the present invention, the conventional sandwich is improved with a french fried potato chip filler.

Two slices of bread 11 can be replaced with two slices of edible grain materials such as corn, bean, rice, barley, millet, foxtail, and/or the like. The slices of bread 11 used may be of a hard texture, a firm texture, or a soft texture.

Referring in details to FIGS. 6, 7, 8, 9, and 10, there is illustrated an additional embodiment of an edible food product in accordance with the present invention. FIG. 6 is a perspective view of an edible food product 110 containing an edible container 112 which is inserted between two slices of bread 11. The edible container such as an edible dish 112 contains a large quantity of unique foods 113 such as hot dog, cooked vegetable, fresh salad, cooked or fresh mushroom, barbecue foods, or the like. FIG. 7 is a cross-sectional view of FIG. 6, taken along line 7—7.

As shown in FIGS. 8, 9, and 10, the edible dish 112 includes an outward bent circumferential end edge 114 disposed along the top edge and a plate bottom 115 having an opening 116 disposed in the center of the plate bottom thereof so as to more tightly adhere the edible container 112 to the inner surfaces of two slices of bread 11 or the like (FIG. 7). Also, the edible container 112 has a V-shaped configuration to allow for convenient stacking during storage (FIG. 8).

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A sandwich comprising:
   two slices of bread, and
   an edible container inserted between said two slices of bread, said edible container housing a food therein and structured to have a V-shaped configuration and contain an outward bent circumferential end edge disposed along the top and a plate bottom thereof for causing the edible container to tightly adhere to the inner surfaces of two slices of bread wherein the food is a food selected from the group consisting of noodles, hot dog, cooked vegetable, fresh salad, cooked or fresh mushroom, barbecue foods, fruit jam, gel butter, and a mixture thereof, whereby the food is contained in a sufficient quantity therein while at the same time it is prevented from falling from the sandwich.

2. The sandwich of claim 1, wherein the edible container is an edible dish.

3. The sandwich of claim 2, wherein the edible dish has a V-shaped configuration to allow for convenient stacking during storage.

4. The sandwich of claim 1, wherein the edible container is made of a material selected from the group consisting of potato, corn, wheat, rice, and a mixture thereof.

5. The sandwich of claim 4, wherein the edible container is made of potato.

6. The sandwich of claim 1, wherein the food is noodles.

7. The sandwich of claim 1, wherein the food is meat, vegetable, and a mixture thereof.

8. The sandwich of claim 1, wherein the two slices of bread are replaced with a food selected from the group consisting of two slices of cracker, two pieces of rice cake, and two pieces of bun.

9. A sandwich comprising:
two slices of bread, and
an edible container inserted between said two slices of bread, said edible container housing a food therein and structured to have a V-shaped configuration and contain an outward bent circumferential end edge disposed along the top and a plate bottom having an opening disposed in the center of the plate bottom thereof for causing the edible container to tightly adhere to the inner surfaces of two slices of bread wherein the food is a food selected from the group consisting of noodles, hot dog, cooked vegetable, fresh salad, cooked or fresh mushroom, barbecue foods, fruit jam, gel butter, and a mixture thereof, whereby the food is contained in a sufficient quantity therein while at the same time it is prevented from falling from the sandwich.

10. The sandwich of claim 9, wherein the edible container is an edible dish.

11. The sandwich of claim 10, wherein the edible dish has a V-shaped configuration to allow for convenient stacking during storage.

12. The sandwich of claim 9, wherein the edible container is made of a material selected from the group consisting of potato, corn, wheat, rice, and a mixture thereof.

13. The sandwich of claim 12, wherein the edible container is made of potato.

14. The sandwich of claim 9, wherein the food is noodles.

15. The sandwich of claim 9, wherein the food is meat, vegetable, and a mixture thereof.

16. The sandwich of claim 9, wherein the two slices of bread are replaced with a food selected from the group consisting of two slices of cracker, two pieces of rice cake, and two pieces of bun.

* * * * *